US006089801A

United States Patent [19]

Hardesty

[11] Patent Number: 6,089,801

[45] **Date of Patent: *Jul. 18, 2000**

[54] MACHINE TOOL WITH IMPROVED WORKPIECE HOLDDOWN SYSTEM

[75] Inventor: Michael P Hardesty, Dale, Ind.

[73] Assignee: Thermwood Corporation, Dale, Ind.

[ * ] Notice: This patent issued on a continued prosecution application filed under 37 CFR 1.53(d), and is subject to the twenty year patent term provisions of 35 U.S.C. 154(a)(2).

[21] Appl. No.: 09/109,017

[22] Filed: Jul. 1, 1998

[51] Int. Cl.[7] .......... B23D 7/08

[52] U.S. Cl. .......... 409/225; 83/451

[58] Field of Search .......... 269/21; 409/219, 409/225; 83/951

[56] References Cited

U.S. PATENT DOCUMENTS

| | | | |
|---|---|---|---|
| 4,049,484 | 9/1977 | Priest et al. | 269/21 |
| 4,723,766 | 2/1988 | Beeding | 269/21 |
| 4,906,011 | 3/1990 | Hiyamizu et al. | 269/21 |
| 5,177,857 | 1/1993 | Ito | 269/21 |
| 5,316,255 | 5/1994 | Marcusen | 269/21 |
| 5,374,829 | 12/1994 | Sakamoto et al. | 269/21 |
| 5,553,837 | 9/1996 | Kahle | 269/21 |
| 5,562,276 | 10/1996 | Blick | 269/21 |
| 5,660,380 | 8/1997 | Reis et al. | 269/21 |

FOREIGN PATENT DOCUMENTS

| | | | |
|---|---|---|---|
| 19647 | 2/1984 | Japan | 269/21 |
| 4035827 | 2/1992 | Japan | 269/21 |

*Primary Examiner*—Andrea L. Pitts
*Assistant Examiner*—Adesh Bhargava
*Attorney, Agent, or Firm*—Lalos & Keegan

[57] ABSTRACT

A machine tool generally consisting of a base member; a table mounted on the base member having a workpiece support surface, a plenum and at least one port in the support surface of the table communicating with the plenum; means communicable with the plenum for producing a vacuum therein; a check valve including a body disposable on the table in blocking relation with the port, having a passageway therethrough intercommunicating the plenum and the exterior of the table when the valve body is disposed in blocking relation with the port, and a valve element disposed in the body passageway of the valve body displaceable between a first position under a first condition blocking the body passageway and a second position under a second condition unblocking the body passageway; and a tool operatively engageable with a workpiece positioned on the table overlying the check valve when the valve element of the check valve is in the second position under the second condition.

47 Claims, 3 Drawing Sheets

MACHINE TOOL WITH IMPROVED WORKPIECE HOLDDOWN SYSTEM

The is a Continued Prosecution Application of U.S. patent application Ser. No. 09/109,017, filed on Jul. 1, 1998.

BACKGROUND OF THE INVENTION

Computer numerical control machine tools such routers used in the woodworking, plastics nonferrous metal industries, typically consist of a base unit, a stationary or movable workpiece support table mounted on a base unit, a stationery or movable gantry mounted on or adjacent the base unit, and a toolhead assembly mounted on a transversely disposed bridge member of the gantry. Either the table or the gantry is displaceable relative to the base unit longitudinally or along an x-axis, the toolhead assembly is displaceable transversely or along a y-axis and the tool is displaceable vertically or along a z-axis. The table or gantry, the toolhead assembly and the tool are displaced along their respective axes by feedscrews driven by servomotors. The motions of the various components of the machine are controlled by a controller which operates the various servomotors of the machine according to instructions of a program inputted into the controller.

Workpieces to be machined are positioned on the table of the machine and located in predetermined locations by the use of pop-up pins provided on the table or other means, and are held down by various means including clamps and vacuum systems. Vacuum systems may consist of conventional systems which are suitable for large production runs, and universal systems which are more suitable for short production runs. A conventional vacuum system generally includes a vacuum port provided in the workpiece table, connected to a vacuum pump and a vacuum fixture positioned on the workpiece table about the vacuum port on which the workpiece is positioned. The fixture is provided with a peripheral rubber seal engaged by the workpiece seated thereon, which permits the evacuation of air between the fixture and the workpiece to hold the workpiece in place. A universal vacuum system generally includes a table having a lower rigid plate, an intermediate plate having a recessed upper surface arranged in a grid pattern, an upper spoilboard formed of a porous material such as particleboard, closing the recessed grid pattern in the intermediate board to form a plenum and vacuum pump operatively connected to the plenum. As a vacuum is applied to the plenum, air is drawn through the particleboard to produce a low pressure zone at the surface of the particleboard, which functions to hold a workpiece positioned on the particleboard.

Although both conventional and universal vacuum systems of the type described have been effective in holding down workpieces in both long and short production runs, they have several disadvantages. They either require special vacuum fixtures as in the instance of conventional vacuum systems or require a large amount of airflow to remove the air drawn through the particleboard of universal systems. It thus has been desirable to provide an improved vacuum system for holding down workpieces positioned on the table of a machine tool of the type described which will provide greater versatility in positioning workpieces on the table and which will not require a high volume of airflow to provide a vacuum sufficient to effectively hold down workpieces to be machined.

SUMMARY OF THE INVENTION

The present invention provides for a machine tool generally consisting base unit; a table mounted on the base unit having a workpiece support surface, a plenum and at least one port in the support surface communicating with the plenum; means communicable with the plenum for producing a vacuum therein; a check valve disposed in the vacuum port; and a tool operatively engageable with a workpiece positioned on the table closing the vacuum port. The check valve disposed in the vacuum port includes a body having a passageway therethrough intercommunicating the plenum and the exterior of the table, and a valve element disposed in the body passageway displaceable between a first position under a first condition of the valve body obstructing the body passageway, and a second position under a second condition of the valve body unobstructing the body passageway. In the preferred embodiment of the invention, the first condition of the valve body constitutes a first orientation of the valve body in the vacuum port and the second condition of the valve body constitutes a second orientation of the valve body in the vacuum port. The invention further contemplates an array of such vacuum ports on the workpiece support table, each provided with such a check valve permitting a variety of combinations of such valves to be activated for holding one or more workpieces to be held and machined.

DESCRIPTION OF THE PREFERRED EMBODIMENT OF THE INVENTION

Figure 1:
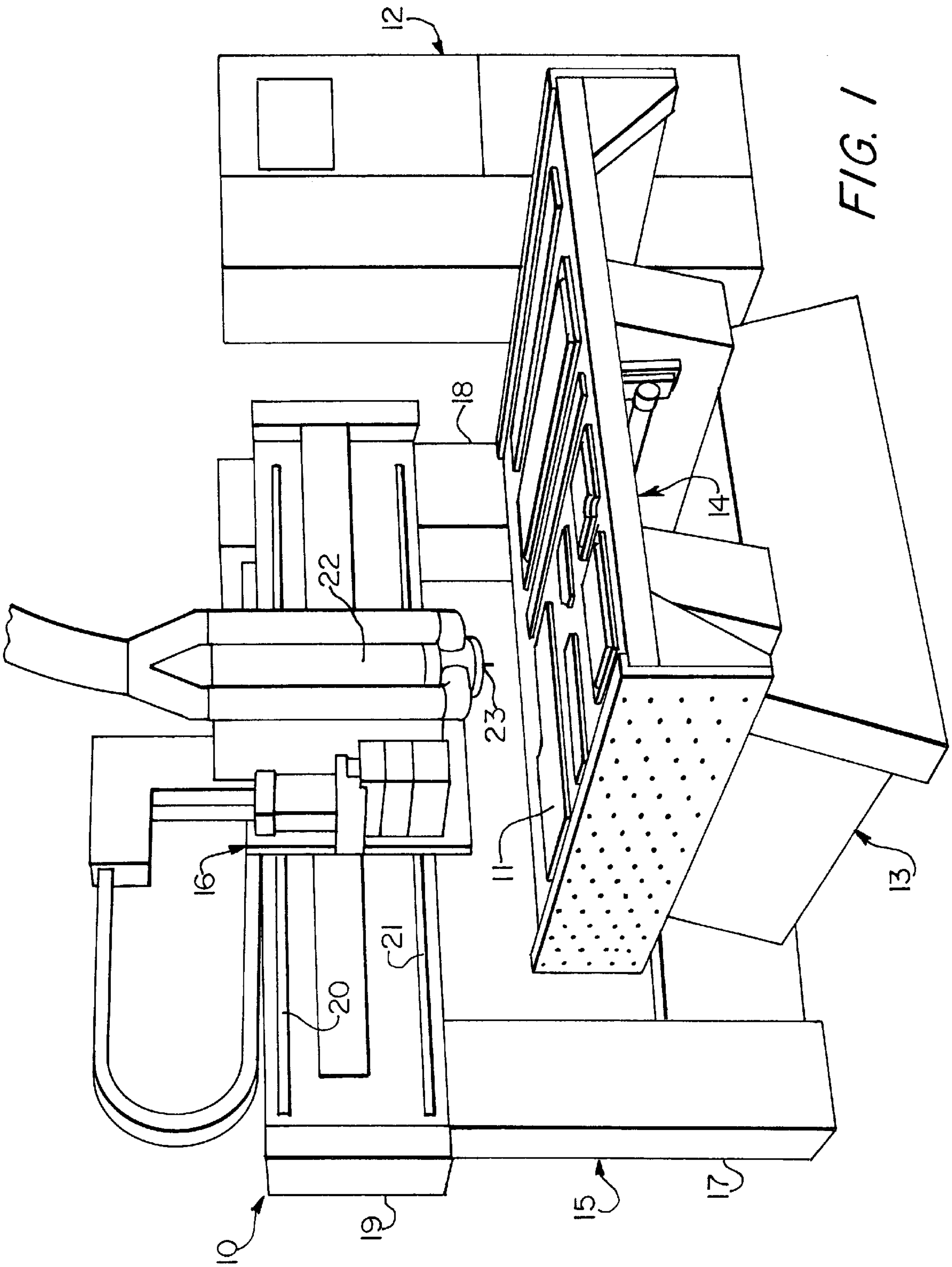
FIG. 1 is a perspective view of a CNC machine tool embodying the present invention.

Referring to FIG. 1 of the drawings, there is illustrated a computer numerical control machine 10 operative to perform various machining functions on one or more workpieces 11 positioned on the machine, and a controller 12 operatively connected to the machine for controlling its functions pursuant to a program inputted into the controller. The machine includes a base unit 13, a movable workpiece support table 14, a stationary gantry 15 and a toolhead support assembly 16. Workpiece support table 14 is mounted on a set of longitudinally disposed guideways provided on the base unit and is adapted to be displaced longitudinally or along an x-axis by means of a feedscrew assembly driven by a servomotor operated by the controller. Gantry 15 includes a pair of support leg sections 17 and 18 disposed adjacent the base unit and spaced apart sufficiently to permit the workpiece support table to be displaced therebetween along the x-axis, and a transversely disposed bridge section 19 rigidly secured to the upper ends of the leg sections and spanning the distance therebetween above the workpiece support table. The front face of the bridge section is provided with a pair of transversely disposed, vertically spaced guideways 20 and 21 on which there is supported toolhead support assembly 16 for displacement transversely or along a y-axis. The toolhead support assembly is displaced along the y-axis by a feedscrew assembly driven by a servomotor operated by the controller. Mounted on a pair of transversely spaced, vertically disposed guideways on the toolhead support assembly is a toolhead assembly 22 adapted to be displaced vertically or along a z-axis. The toolhead assembly also is displaced by a feedscrew assembly driven by a servomotor operated by the controller. A tool bit 23 is removeably mounted on the lower end of the toolhead assembly which may be positioned in contact with a workpiece mounted on the workpiece support table to perform a variety of machining operations. It will be appreciated that by displacing the table along the x-axis and displacing the tool bit along the x and z-axes responsive to command signals of the controller, the tool bit will be positioned in contact with a workpiece to perform the machining operations.

Figure 2:
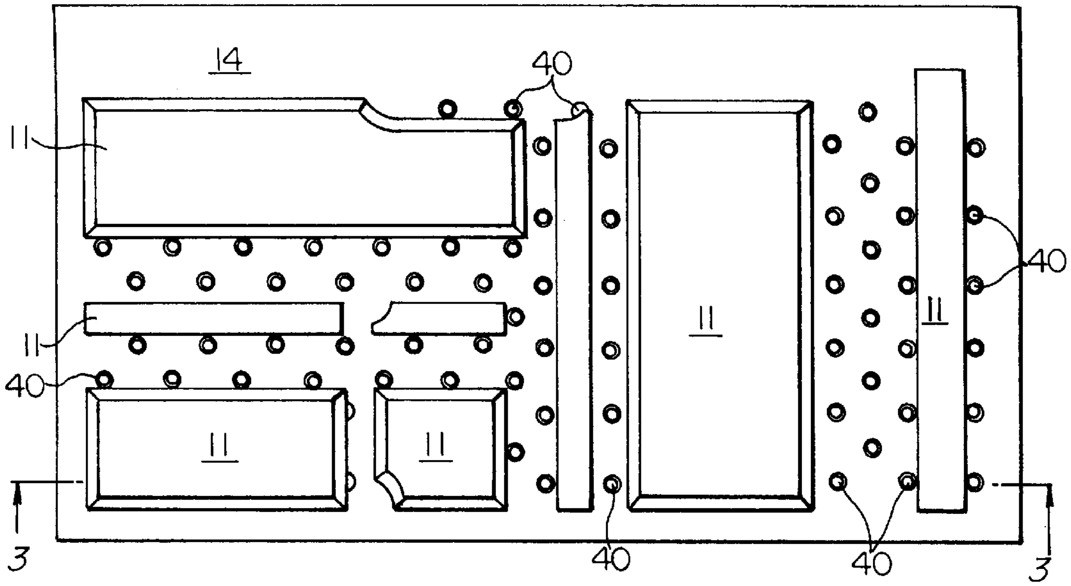
FIG. 2 is a top plan view of the workpiece support table shown in FIG. 1, illustrating an arrangement of a number of workpieces positioned thereon.
Figure 3:
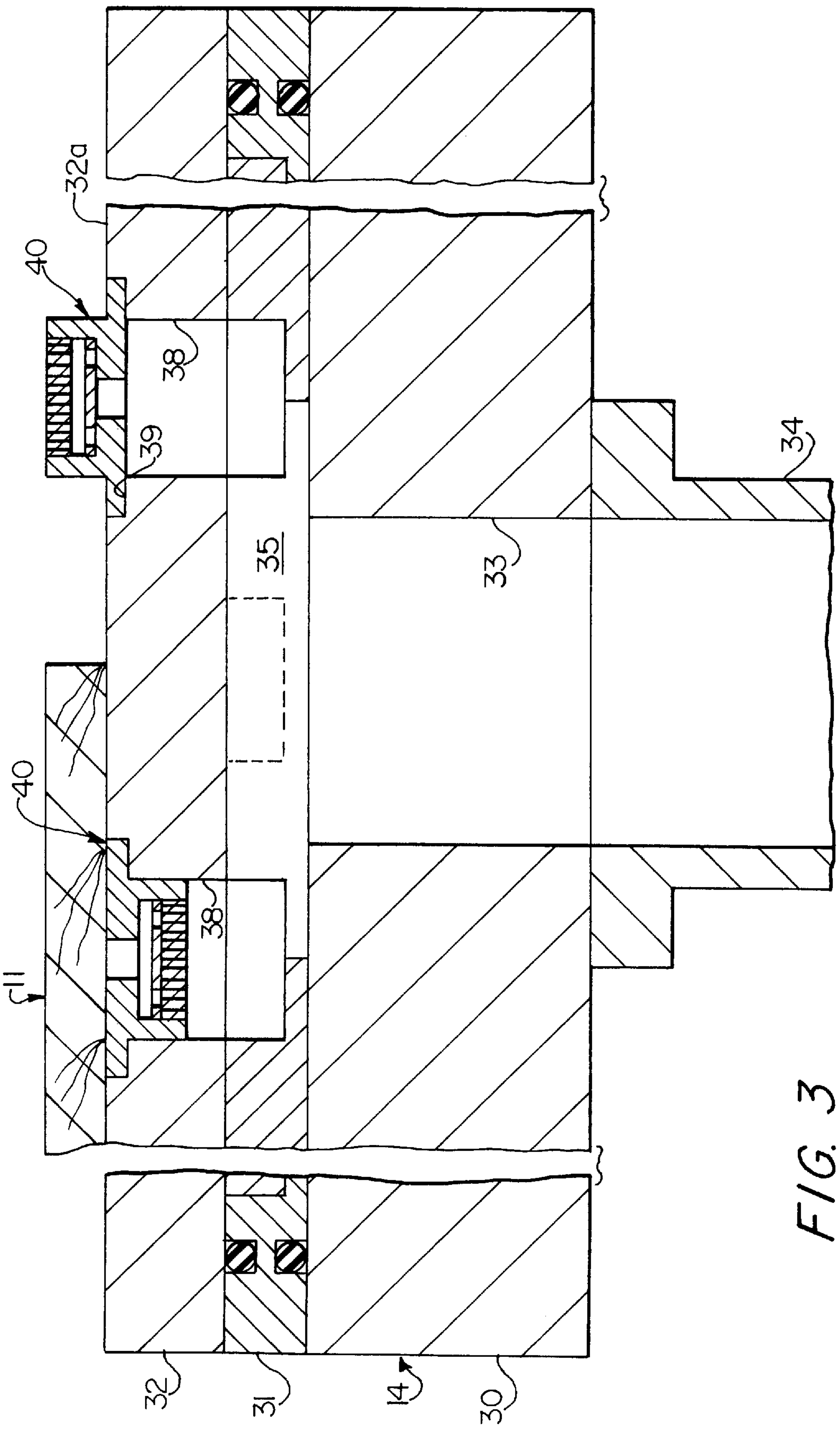
FIG. 3 is an enlarged, vertical cross-sectional view of the workpiece support table shown in FIG. 2, taken along line 3—3 in FIG. 2.

As best shown in FIGS. 2 and 3, workpiece support table 14 includes a rectangularly configured lower plate member 30, an intermediate, rectangularly configured plate member 31 and an upper, rectangularly configured board member 32 commonly referred to as a spoilboard. Plate member 30 is formed of a rigid material, usually a composite or a metal such as aluminum, and is supported on a set of guideways for displacement along the x-axis. It supports and imparts rigidity to the table and is provided with a vertical passageway 33 which communicates through a fitting 34 and a flexible conduit to vacuum pump. The fixture includes a valve for controlling the application of a vacuum to passageway 33. Intermediate plate member 31 also is formed of a metal and is provided with a removed portion in the interior thereof communicating with passageway 33. Upper board member 32 is mounted on intermediate plate member 31 and cooperates with lower plate member 30 and intermediate plate member 31 to provide a plenum 34 communicating at its lower end with passageway 33. Upper board member 32 and intermediate plate member 31 are firmly secured to lower plate member 30 by suitable bolts, and leakage of air into plenum 34 is minimized by a set of peripheral seals 36 disposed between intermediate plate member 31 and upper board member 32, and 37 disposed between intermediate plate member 31 and lower plate member 30. As best seen in FIGS. 2 and 3, upper board member 32 is provided with an array of cylindrically configured vacuum ports 38 intercommunicating the exterior of upper board member 32 and plenum 35. Each of the upper ends of vacuum ports 38 is provided with an enlarged section providing an annular surface 39 for seating a check valve member 40 in first and second positions as shown in FIG. 3.

Figure 4:
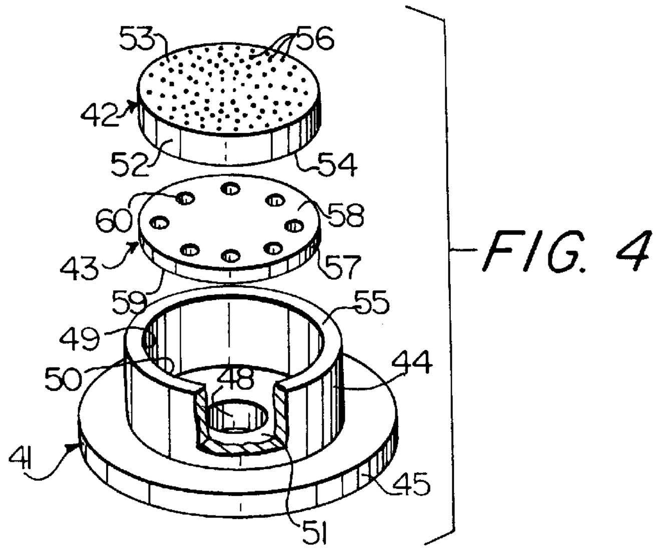
FIG. 4 is an enlarged, perspective view of a check valve utilized on the workpiece support table shown in FIGS. 1 through 3, illustrating the components thereof in exploded relation.
Figure 5:
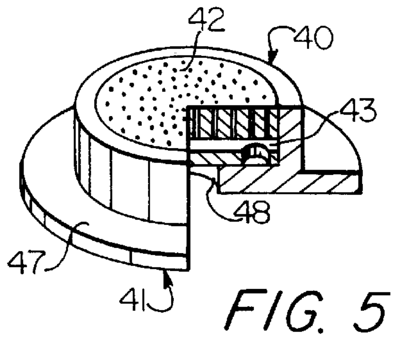
FIG. 5 is a perspective view of the check valve shown in FIG. 5 disposed in a first condition precluding the passageway of air therethrough, having a portion thereof broken away.
Figure 6:
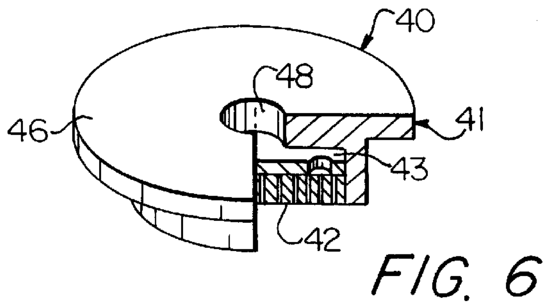
FIG. 6 is perspective view of the check valve shown in FIGS. 4 and 5 disposed in a second condition permitting the passage of air therethrough, having a portion thereof broken away.

Referring to FIGS. 4 through 6, each valve member includes a valve body 41, a closure member 42 and valve disc 43. Valve body 41 is provided with a cylindrical section 44 and an integral, annular flange section 45. The diameter of valve body flange section 45 is similar or slightly smaller than the enlarged section of a vacuum port 38, the thickness of flange section 45 is similar or slightly smaller than the depth of the enlarged section of a vacuum port 38, the diameter of valve body cylindrical section 44 is similar or slightly smaller than the diameter of vacuum port 38 and the length of cylindrical section 44 is less than the depth of a vacuum port 38 so that a check valve member may be seated on an annular surface 39 of a vacuum port in a first orientation as shown in FIG. 5 with an outer surface 46 of the flange section seated on annular surface 39 and the cylindrical section of the valve body projecting above the upper surface 32*a* of board member 32, and in a second orientation as shown in FIG. 6 with an inner annular surface 47 of the flange section seated on annular surface 39, outer surface 46 of the flange section being disposed flush with upper surface 32*a* of board member 32 and the cylindrical section of the valve body projecting into the vacuum port. Valve body 41 further is provided with an axially disposed passageway 48 having an enlarged section 49 providing a cylindrical side wall 50 and annular end wall 51.

Closure member 42 has a disc-shaped configuration including a cylindrical side wall 52 having a diameter similar or slightly larger than the diameter of wall surface 50, an outer cylindrical surface 53 and an inner cylindrical surface 54. The closure member is adapted to be press-fit into enlarged section 49 of valve body 41 so that outer cylindrical surface 53 will be disposed flush with annular end surface 55 of the valve body, and inner circular surface 54 will be axial spaced from annular surface 51 to provide a cylindrical valve chamber. Closure member 42 further is porous or provided with a plurality of passageways 56 intercommunicating the valve chamber with the exterior of the valve. As best shown in FIGS. 5 and 6, passageways 56 disposed adjacent the periphery of the closure member are longitudinally aligned with annular surface 51 of the valve body.

Valve disc 43 also has a circular configuration including a side edge 57 having a diameter similar or slightly less than the diameter of interior side wall 50 of enlarged section 49 of the valve body, and circular end surfaces 58 and 59. It further is provided with a plurality of circumferentially spaced passageways 60 therethrough, and is disposed within the valve chamber of the valve body and displaceable axially therein. When the valve member is in the first position shown in FIG. 5, valve disc 43 will be caused to seat on annular surface 51 of the valve body thus obstructing passageways 60 and correspondingly precluding passage of air through passageways 56 of the closure member, the valve chamber and passageway 48. When the valve member is in the second position as shown in FIG. 6, valve disc 43 will be displaced and caused to seat on inner surface 54 of closure member 42 thus permitting airflow through passageway 48, the valve chamber, passageways 60 of valve plate 43 and passageways 56 of closure member 42 communicating with passageways 60 of the valve plate.

The dimensions of the vacuum ports and their associated valve members may be selected to suit design specifications. It has been found that for conventional table sizes, vacuum ports of 1" diameters and valve members with support flange diameters of 1½" are suitable for providing a sufficient holddown force for most workpieces. The number of vacuum ports and the pattern of the array of the ports may be varied as desired. Preferably, the valve bodies are formed of a molded thermoplastic elastomeric material such as polyurethane, the closure members are formed of a porous bronze material and the valve elements are formed of an elastomeric material such as rubber or polyurethane. Each valve member may be assembled simply by inserting the valve disc in the large open end of the valve body, and then press fitting the closure member in the open end of the valve member, making certain that the valve disc is free to displace axially so that when the valve member is oriented in a first position as shown in FIG. 5, the valve disc will displace and seat on annular 51 to preclude passage of air through the valve member and when the valve member is oriented in the position shown in FIG. 6, the valve disc will displace to engage the closure member and thus permit the passage of air through the valve member.

When the machine is not in use, each of the vacuum ports on the workpiece support table of the machine will be closed with each valve member oriented in the position as shown in FIG. 5 and seated across a valve port as shown on the right hand side of the table in FIG. 3. When it is desired to position a workpiece on the table to be machined, those valve members in the area in which the workpiece is to be positioned are inverted and thus oriented in the position shown on the left hand side of the table shown in FIG. 3 so that the workpiece may be positioned on upper surface 32*a* of board member 32 overlying the set of inverted valves. The protrusion of the valves not inverted will prevent the workpiece of being positioned in wrong locations on surface 32*a*. With the selected valves thus oriented, the vacuum pump may be operated to produce a vacuum in plenum 35 and correspondingly in the valve chambers of the inverted valve members, producing a pressure differential across the workpiece causing it to be firmly seated on the table. The machine may then be operated to perform the desired machining on the workpiece.

The use of the vacuum system as described with the selective employment of the novel valve members not only provides a greater versatility in accurately positioning workpieces on the table of the machine but substantially reduces the energy required to effectively hold down the workpieces being machined. The number of vacuum ports and associated valve members may be varied as well as the pattern of such vacuum ports on the table.

From the foregoing detailed description it will be evident that there are a number of changes, adaptations, an modifications of the present invention which come within the province of those persons having ordinary skill in the art to which the aforementioned invention pertains. However, it is intended that all such variations not departing from the spirit of the invention be considered as within the scope thereof as limited solely by the appended claims.

I claim:

1. A machine tool comprising:

a base member;

a table mounted on said base member having a workpiece support surface, a plenum and at least one port in said workpiece support surface communicating with said plenum;

means communicable with said plenum for producing a vacuum therein;

a check valve including a body disposable in one of a first orientation and a second orientation on said table in obstructing relation with said port, having a passageway therethrough intercommunicating said plenum and the exterior of said table when said body is disposed in said obstructing relation, and a valve element disposed in said body passageway displaceable between a first position under said first orientation obstructing said body passageway and a second position under said second orientation unobstructing said body passageway; and a tool operatively engageable with a workpiece supported on said table overlying said body passageway when said valve element is in said second position under said second orientation.

2. A machine tool according to claim 1 wherein said first orientation comprises a first position of said valve body relative to said port and said second orientation comprises a second position of said valve body relative to said port.

3. A machine tool according to claim 1 wherein said first orientation is opposite to said second orientation.

4. A machine tool according to claim 1 wherein said valve element includes a passageway therethrough intercommunicable with portions of said body passageway, precluding intercommunication between said valve body passageway portions when in said first position and allowing intercommunication between said body valve passageway portions when in said second position.

5. A machine tool according to claim 4 wherein said first orientation comprises a first position of said valve body relative to said port.

6. A machine tool according to claim 4 wherein said first orientation is opposite to said second orientation.

7. A machine tool according to claim 4 wherein said passageway in said valve element is closed by a wall surface of said valve body when said valve element is in said first position.

8. A machine tool according to claim 7 wherein said passageway of said valve element is misaligned relative to one of said portions of said valve body passageway.

9. A machine tool according to claim 8 wherein said valve element is displaceable along a given axis, and said valve element passageway is closed by a wall surface of said valve body when said valve element is in said first position.

10. A machine tool according to claim 9 wherein said valve element passageway is radially displaced from one of said portions of said valve body passageways.

11. A machine tool according to claim 1 wherein a port of said valve body projects beyond the plane of said table surface under said first orientation.

12. A machine tool according to claim 1 wherein said valve body is formed of a thermoplastic elastomeric material and said valve element is formed of an metal.

13. A machine tool according to claim 12 wherein said thermoplastic elastomeric material consists of a polyurethane material.

14. A machine tool according to claim 1 wherein said valve body passageway includes an enlarged section providing a peripheral seating surface, including a closure body disposed in said enlarged passageway section, spaced from said peripheral seating surface to provide a valve chamber, and having a passageway intercommunicating said valve chamber and the exterior thereof and longitudinally aligned with a portion of said peripheral seating surface, and wherein said valve element is disposed in said valve chamber, has a thickness less than the longitudinal dimension of said chamber and a passageway therethrough aligned with a portion of said peripheral seating surface and is displaceable between said first position wherein said valve element engages said peripheral seating surface to close said passageway therein and said second position wherein said passageway therein intercommunicates said valve chamber and said passageway in said closure body.

15. A machine tool according to claim 14 wherein said valve body passageway is disposed along a given axis, said valve element has a cross-sectional configuration similar to the cross sectional configuration of said valve chamber and the passageway of said valve element is radially displaced relative to said axis.

16. A machine tool according to claim 15 wherein said closure body comprises a porous metallic body.

17. A machine tool according to claim 15 wherein said valve body is formed of a thermoplastic elastomic material and said element is formed of a metal.

18. A machine tool according to claim 17 wherein said thermoplastic elastomeric material consist of a polyurethane material.

19. A machine tool according to claim 1 wherein said port includes an enlarged section at the surface of said table and said valve body includes a peripheral flange seatable on a peripheral surface of said enlarged section in either of said first and second orientations.

20. A machine tool according to claim 1 wherein said table is stationary.

21. A machine tool according to claim 1 wherein said table is displaceable along a line of travel.

22. A table for a machine tool for supporting a workpiece thereon upon which a work function may be performed comprising:

a lower plate member mountable on a machine base;

an intermediate plate member mounted on said base plate member, having a recessed portion in an upper surface thereof;

an upper plate member mounted on said intermediate plate member and cooperating with said recessed portion thereof to provide a plenum communicable with vacuum producing means, having at least one port intercommunicating said plenum and the exterior of said upper plate member; and a check valve including a bodily disposable in one of a first orientation and a second orientation on said upper plate member in obstructing relation with said port, having a passageway therethrough intercommunicating said plenum and the exterior of said upper plate member when said body is disposed in said obstructing relation, a valve element disposed in said body passageway displaceable between a first position under said first orientation obstructing said body passageway and a second position under said second orientation unobstructing said body passageway.

23. A table according to claim 22 wherein said first orientation comprises a first position of said vavle body relative to said port and said second orientation comprises a second position of said valve body relative to said port.

24. A table according to claim 22 wherein said first orientation is opposite to said second orientation.

25. A table according to claim 22 wherein said valve element includes a passageway therethrough intercommunicable with portions of said body passageway, precluding intercommunication between said valve body passageway portions when in said first position and allowing intercommunication between said valve body passageway poritions when in said second postion.

26. A table according to claim 25 wherein said first condition comprises a first position of said valve body relative to said port and said second orientation comprises a second position of said valve body relative to said port.

27. A table according to claim 25 wherein said first orientation is opposite to said second orientation.

28. A table according to claim 25 wherein said passageway in said valve element is closed by a wall surface of said valve body when valve element is in said first position.

29. A new check valve mountable on a workpiece support table of a machine tool relative to a port therein communicable through a plenum with a vacuum producing means comprising:

a valve body disposable in one of a first orientation and a second orientation on said table in obstructing relation with said port, having a passageway therethrough intercommunicating said plenum and the exterior of said table when said valve body is disposed in said obstrucing relation; and a valve element disposed in said valve body passageway displaceable between a first position under said first orientation obstructing said body passageway and a second position under said second orientation unobstructing said body passageway.

30. A check valve according to claim 29 wherein said first orientation comprises a first position of said valve body relatives to said port and said second orientation comprises a second position of said valve body relative to said port.

31. A check valve according to claim 29 wherein said first orientation is opposite to said second orientation.

32. A check valve according to claim 29 wherein said valve element includes a passageway therethrough intercommunicable with portions of said body passageway, precluding intercommunication between said vavle body passageway portions when in said first position and allowing intercommunication between said valve body passageway portions when in said second position.

33. A check valve according to claim 32 wherein said first orientation comprises a first position of said valve body relative to said port and said second orientation comprises a second position of said valve body relative to said port.

34. A check valve according to claim 32 wherein said first orientation is opposite to said second orientation.

35. A check valve according to claim 32 wherein said passageway in said valve element is closed by a wall surface of said valve body when said valve element is in said first position.

36. A check valve according to claim 35 wherein said passageway in said valve element is misaligned relative to one of said portions of said valve body passageway.

37. A check valve according to claim 36 wherein said valve element is displaceable along a given line of travel, and said valve element passageway is closed by a wall surface of said value body when said value element is in said first position.

38. A check valve according to claim 37 wherein said valve element passageway is offset from one of said portions of said valve body passageways.

39. A check valve according to claim 29 wherein a portion of said valve body projects beyond the plane of said table surface under said first orientation.

40. A check valve according to claim 29 wherein said valve body is formed of a thermoplastic elastomic material and said valve element is formed of a metal.

41. A check valve according to claim 40 wherein said thermoplastic elastomic material consists of a polyurethane material.

42. A check valve according to claim 29 wherein said valve body passageway includes an enlarged section providing a peripheral seating surfac chamber and having a passageway intercommunicating said valve chamber and the exterior thereof and longitudinally aligned with a portion of said peripheral seating surface, and wherein said valve element is disposed in said valve chamber, has a thickness less than the longitudinal dimension of said valve chamber and a passageway therethrough and is displaceable between said first position when said valve element engages said peripheral seating surface to close said passageway therein and said second position wherein said passageway therein communicates with said passageway in said closure body.

43. A check valve according to claim 42 wherein said valve body passageway is disposed along a given axis, said valve element has a cross-sectional configuration similar to the cross-sectional configuration of said valve chamber and the passageway in said valve element is radially displaced relative to said axis.

44. A check valve according to claim 43 wherein said closure body comprises a porous metallic body.

45. A check valve according to claim 43 wherein said valve body is formed of a thermoplastic elastomeric material and said valve element is formed of a metal.

46. A check vavle according to claim 45 wherein said thermoplastic material consists of a polyrethane material.

47. A check valve according to claim 29 wherein said valve body includes a peripheral flange seatable in an enlarged section of said port at the structure of said table in either of said first and second orientations.

* * * * *

UNITED STATES PATENT AND TRADEMARK OFFICE
CERTIFICATE OF CORRECTION

PATENT NO. : 6,089,801
DATED : July 18, 2000
INVENTOR(S) : Michael P. Hardesty

It is certified that error appears in the above-identified patent and that said Letters Patent is hereby corrected as shown below:

Claim 5,
Last line, before the "." insert the following: -- and said second orientation comprises a second position of said valve body relative to said port --.

Claim 11,
Line 1, after "wherein a" change "port" to read -- portion --.

Claim 12,
Last line, change "an" to read -- a --.

Claim 23,
Line 2, after "said" correct spelling of -- valve --.

Claim 25,
Line 6, after "passageway" correct spelling of -- portions --.

Claim 26,
Line 2, "condition" should read -- orientation --.

Claim 29,
Line 1, delete "new".

Claim 32,
Line 4, after "said" correct spelling of -- valve --.

Claim 37,
Line 4, after "said" correct spelling of -- valve --, first and second occurrences.

Claim 46,
Line 1, correct spelling of -- valve --;
Line 2, after "thermoplastic" insert -- elastomeric --.

UNITED STATES PATENT AND TRADEMARK OFFICE

CERTIFICATE OF CORRECTION

PATENT NO. : 6,089,801
DATED : July 18, 2000
INVENTOR(S) : Michael P. Hardesty

It is certified that error appears in the above-identified patent and that said Letters Patent is hereby corrected as shown below:

In the specification, add the following as the first sentence: -- This invention relates to CNC machines and more particularly to a CNC machine tool having improved workpiece holddown means. --

Signed and Sealed this

Eighteenth Day of September, 2001

Attest:

Nicholas P. Godici

NICHOLAS P. GODICI

*Attesting Officer*

*Acting Director of the United States Patent and Trademark Office*